United States Patent
Marini et al.

(10) Patent No.: US 10,264,479 B2
(45) Date of Patent: Apr. 16, 2019

(54) TEST APPARATUS FOR A TELECOMMUNICATION NETWORK AND METHOD FOR TESTING A TELECOMMUNICATION NETWORK

(71) Applicant: PRISMA TELECOM TESTING S.r.l., Milan (IT)

(72) Inventors: Paolo Marini, Sauze d'Oulx (IT); Lodovico Binda, Olgiate Molgora (IT); Luigi Travaglini, Gessate (IT); Enrico Bendinelli, Monza (IT)

(73) Assignee: Prisma Telecom Testing S.R.L., Milan (IT)

( * ) Notice: Subject to any disclaimer, the term of this patent is extended or adjusted under 35 U.S.C. 154(b) by 27 days.

(21) Appl. No.: 15/294,636

(22) Filed: Oct. 14, 2016

(65) Prior Publication Data
US 2017/0111808 A1 Apr. 20, 2017

(30) Foreign Application Priority Data
Oct. 16, 2015 (IT) .................. 102015000062692

(51) Int. Cl.
| | |
|---|---|
| H04L 12/24 | (2006.01) |
| H04W 16/22 | (2009.01) |
| H04W 24/06 | (2009.01) |
| H04W 88/08 | (2009.01) |

(52) U.S. Cl.
CPC ........... *H04W 24/06* (2013.01); *H04W 16/22* (2013.01); *H04L 41/145* (2013.01); *H04W 88/08* (2013.01)

(58) Field of Classification Search
CPC . H04B 17/0087; H04B 17/309; H04W 24/00; H04W 24/06; H04W 16/22; H04W 88/08; H04L 41/145
See application file for complete search history.

(56) References Cited

U.S. PATENT DOCUMENTS

| | | | |
|---|---|---|---|
| 2009/0037163 A1* | 2/2009 | Kong | G06F 9/455 703/21 |
| 2009/0131044 A1* | 5/2009 | Marini | H04W 24/06 455/424 |
| 2014/0321303 A1 | 10/2014 | Iyer et al. | |

FOREIGN PATENT DOCUMENTS

| | | |
|---|---|---|
| EP | 2 330 843 A1 | 6/2011 |
| EP | 2 523 494 A1 | 11/2012 |

OTHER PUBLICATIONS

Italian Search Report and Written Opinion for corresponding Italian Patent Application No. ITUB20154969, 10 pp., (dated Jun. 16, 2016).

* cited by examiner

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

A test apparatus for a telecommunication network includes: simulated mobile terminals, which supply respective bit streams; and SDR stages, which receive the bit streams of respective simulated mobile terminals that communicate with respective base stations and have respective SDR uplink stages and SDR downlink stages. An SDR uplink stage includes: at least one processing branch, which converts the bit stream of a respective mobile terminal into a baseband signal; a mapping module, which generates a respective uplink sub-carrier vector via a mapping of the baseband signals; an inter-cell interference module, which combines the sub-carrier vector with the uplink sub-carrier vectors of at least one of the other SDR stages; and an inverse-transform module, which performs an inverse transform of the baseband signals.

12 Claims, 7 Drawing Sheets

TEST APPARATUS FOR A TELECOMMUNICATION NETWORK AND METHOD FOR TESTING A TELECOMMUNICATION NETWORK

FIELD OF THE INVENTION

The present invention relates to a test apparatus for a telecommunication network and to a method for testing a telecommunication network.

BACKGROUND OF THE INVENTION

As is known, wireless telecommunication systems comprise a network infrastructure and mobile terminals. The network infrastructure generally comprises one or more interconnected management centres and radio base stations, which are organized for ensuring coverage of a given territory and communicate with a respective management centre. The mobile terminals link up to the network infrastructure through one or more of the radio base stations and may comprise, for example, cellphones, portable computers, or palmtops with radiofrequency connection functions, and the like.

The network infrastructure needs to undergo tests that will enable verification of proper operation thereof. Testing of the entire network infrastructure or of a part thereof may become necessary for various reasons. For example, in the design and implementation step, it could be necessary to verify the functions of the radio base station when in connection with one or more terminals of which it is possible to modify the behaviour in order to simulate situations of failure or errors in the communication protocol. Further, it could be necessary to verify the expected behaviour of the station radio base in the presence of network load determined by a number of user terminals that are simultaneously active.

Further, one of the most important functions of a radio base station increasingly lies in the management of the radio resources, i.e., in the capacity of optimizing the use of the available bandwidth, minimizing the interference and the requests for retransmission and maximizing the performance that may be obtained on a plurality of terminals. The most critical situations arise when the users are distributed within the area covered by the cell and especially in the so-called cell-boundary area, i.e., the boundary region between adjacent cells. These situations require accurate verifications in realistic conditions, which may not be created with the use of a single conventional channel simulator for the entire population of terminals.

One of the main problems that it is necessary to take into account in the design and implementation of tests on mobile radio-communication systems derives from the fact that, in order not to penalize the transmission throughput, frequently adjacent cells are authorized to use the same resource blocks (i.e., sets of sub-carriers for a given timeslot). The mobile terminals are frequently in motion and may frequently be located in cell-boundary regions, which are exposed to the risk of inter-cell interference. In practice, in the cell-boundary regions the communication of a mobile terminal with the serving cell may be disturbed by the signals coming from an adjacent cell that uses the same resource blocks.

Of course, to render the test campaigns more reliable, it is expedient to investigate also the inter-cell interference phenomena by appropriate simulations. Among other things, in the conditions of actual use, in a communication network numerous mobile terminals, with different movement profiles, may be simultaneously connected to a same cell.

The complexity of the telecommunication networks based on an OFDM modulation, which is due both to the modality of modulation and to the management of the radio resources, requires verification and validation techniques based upon simulation of a radio environment with a multiplicity of mobile terminals independent of one another.

However, currently available mobile-terminal simulators are not suited, as regards their structure, functions, and computational load required, for simulating the inter-cell interference phenomena with sufficiently numerous populations of mobile terminals.

SUMMARY OF THE INVENTION

The aim of the present invention is thus to provide a test apparatus for a telecommunication network based upon OFDM or SC-FDMA technology and a method for testing a telecommunication network based upon OFDM or SC-FDMA technology that will enable the limitations described above to be overcome.

According to the present invention, there is provided a test apparatus for a telecommunication network based upon OFDM or SC-FDMA technology, the test apparatus comprising:

a plurality of simulated mobile terminals, configured to supply respective bit streams, in accordance with a communication standard;

a plurality of SDR stages configured to receive the bit streams of respective simulated mobile terminals and to communicably couple with respective base stations of a telecommunication network, the SDR stages comprising respective SDR uplink stages and respective SDR downlink stages;

wherein at least one SDR uplink stage comprises:

at least one parallel processing branch, which is coupled to a respective one of the simulated mobile terminals for receiving the corresponding bit stream and is configured to convert the respective bit stream into a respective baseband signal in the frequency domain, which represents the amplitude and phase associated with a respective sub-carrier assigned for a time interval;

a mapping module configured to generate a respective uplink sub-carrier vector via a mapping of the baseband signals in which each baseband signal is assigned a sub-carrier for modulation;

an uplink inter-cell interference module, configured to combine the uplink sub-carrier vector of the respective SDR stage with the uplink sub-carrier vectors of at least one of the other SDR stages; and an inverse-transform module, configured to perform an inverse transform of the baseband signals.

According to another aspect of the present invention, there is provided a method for testing a telecommunication network based upon OFDM or SC-FDMA technology, the method comprising:

supplying a plurality of bit streams, in accordance with a communication standard, the bit streams being representative of respective simulated mobile terminals;

processing the bit streams; and transmitting to a plurality of base stations signals derived from respective sets of processed bit streams;

wherein processing comprises:
converting the bit streams into respective baseband signals in the frequency domain, which represent the amplitude and phase associated with respective sub-carriers assigned for a time interval;
generating a respective uplink sub-carrier vector for each base station via a mapping of the respective baseband signals in which each baseband signal is assigned a sub-carrier for modulation;
combining the uplink sub-carrier vector associated with a base station with the uplink sub-carrier vectors of at least one of the other base stations; and
performing an inverse transform of the baseband signals.

BRIEF DESCRIPTION OF THE DRAWINGS

The present invention will now be described with reference to the annexed drawings, which illustrate some non-limiting examples of embodiment thereof and in which.

DETAILED DESCRIPTION OF THE INVENTION

Figure 1:
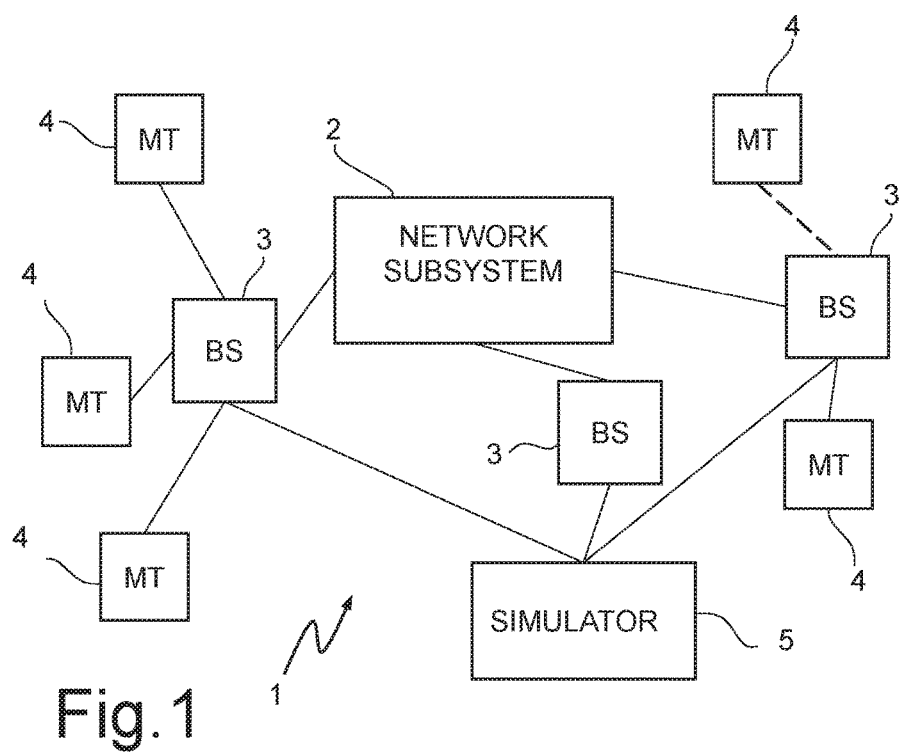
FIG. 1 is a simplified block diagram of a wireless telecommunication network.

FIG. 1 shows in a simplified way a telecommunication network 1 according to an embodiment of the present invention. The telecommunication network 1 is a frequency-division, or else a time-division, multiple-access wireless telecommunication network. In one embodiment, for example, the telecommunication network 1 is a network based upon OFDM (Orthogonal Frequency Division Multiplexing) technology or SC-FDMA (Single Carrier-Frequency Division Multiple Access) technology, in particular an LTE network. The telecommunication network 1 comprises a network subsystem 2, a plurality of radio base stations or eNodeBs 3 and a plurality of mobile terminals 4. Here and in what follows, by "wireless telecommunication system" is meant a telecommunication system in which at least the link between the mobile terminals and a network infrastructure is obtained by radio-frequency connection.

In the example described herein, the network infrastructure, to which the mobile terminals 4 may be connected, is defined by the network subsystem 2 and by the eNodeBs 3, permanently connected thereto. In particular, the mobile terminals 4 may establish a link through one of the eNodeBs 3, which is selected for optimizing signal transmission and reception according to modalities set down by the standard implemented. FIG. 1 further shows a mobile-terminal simulator 5, connected to at least one of the eNodeBs 3 in order to perform tests of functionality of the telecommunication system 1 or of a part thereof.

In particular, the mobile-terminal simulator 5 enables simulation of a population of mobile terminals, the disturbance caused by the communication channel, and the inter-cell interference for each member of the population, in a plurality of different conditions.

Figure 2:
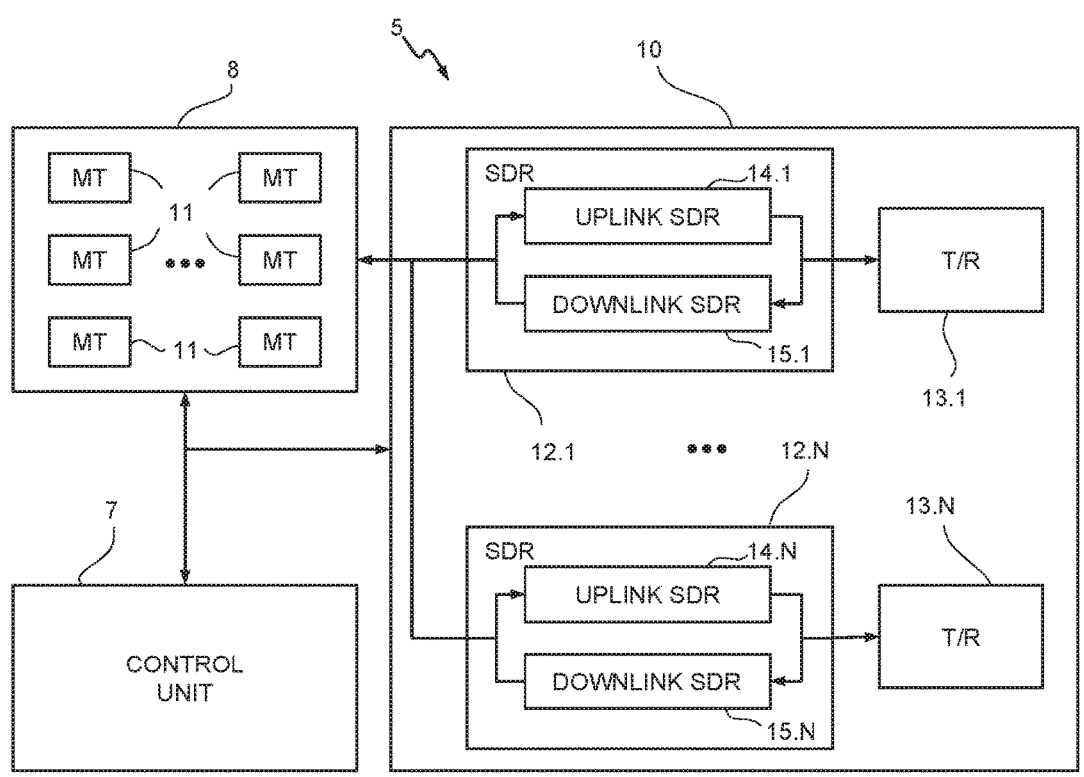
FIG. 2 is a simplified block diagram of a test apparatus for a telecommunication network based upon OFDM or SC-FDMA technology and a method for testing a telecommunication network based upon OFDM or SC-FDMA technology according to a first embodiment of the present invention, which may be used in the wireless telecommunication network of FIG. 1.

As shown in FIG. 2, the mobile-terminal simulator 5 comprises a control unit 7, a protocol-simulator stage 8, and an SDR (Software-Defined Radio) unit 10.

The protocol-simulator stage 8 is configured to create a plurality of simulation engines, each of which defines a simulated mobile terminal 11. The set of the simulation engines thus defines a population of simulated mobile terminals 11, which communicate with one or more eNodeBs 3 of the telecommunication system 1. The simulation is obtained by implementing protocol stacks of a communication standard. The simulated mobile terminals 11 are further configured to carry out the typical functions of a mobile terminal, such as registration, call, and data transfer. Each simulated mobile terminal 11 supplies a respective bit stream comprising data sequences and control sequences in accordance with the communication standard implemented.

The SDR unit 10 is configured to create a plurality of SDR stages 12.1, ..., 12.N, each connected to a respective eNodeB 3 in uplink and in downlink through a respective transmitter/receiver stage 13.1, ..., 13.N. Each SDR stage 12.1, ..., 12.N simulates communication channels between a set (which may contain just one element) of simulated mobile terminals 11 and a respective eNodeB 3 that functions as serving cell for the set of simulated mobile terminals 11. In particular, each SDR stage 12.1, ..., 12.N comprises a respective SDR uplink stage 14.1, ..., 14N and a respective SDR downlink stage 15.1, ..., 15.N.

Figure 3:
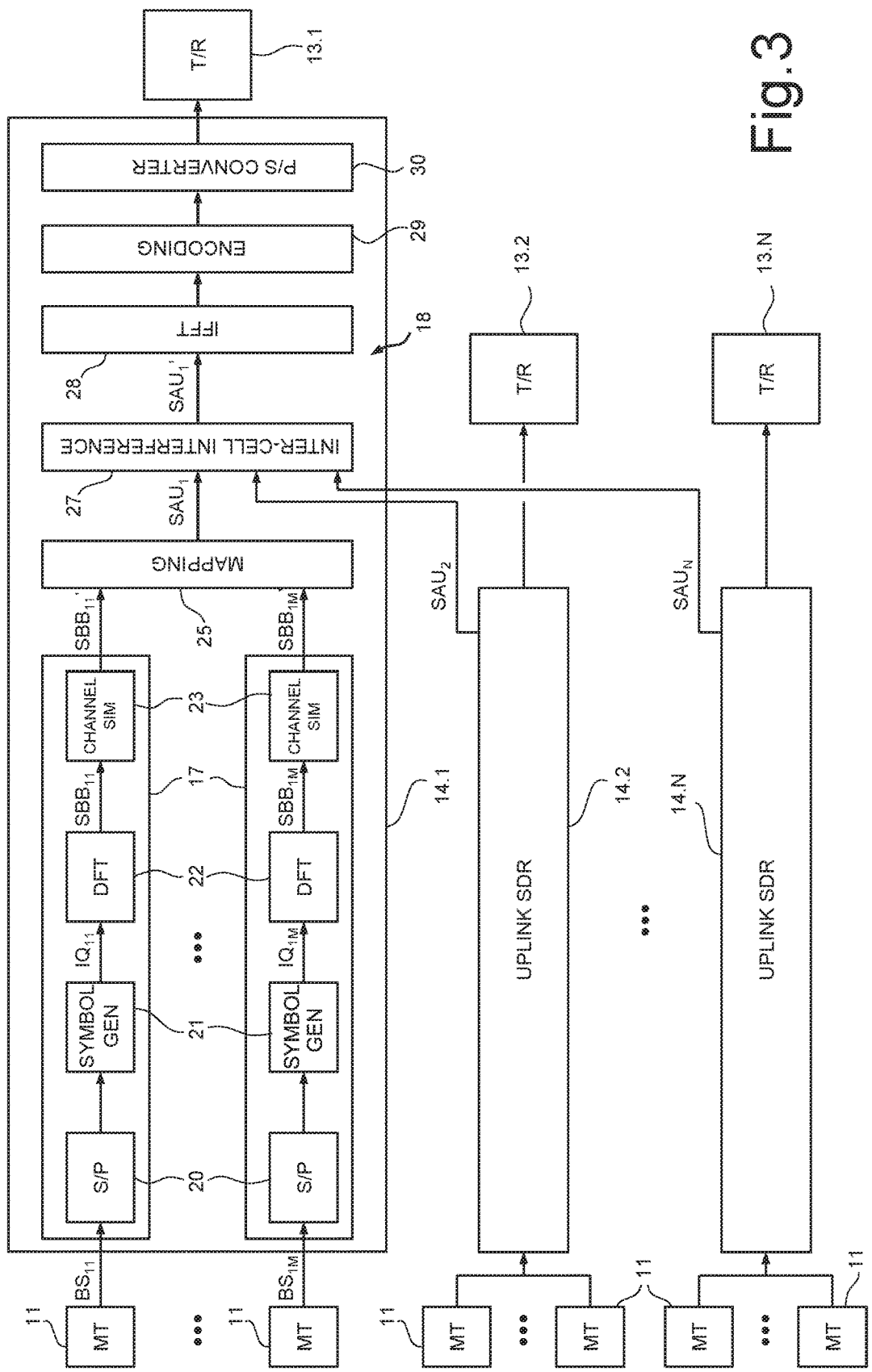
FIG. 3 is a more detailed block diagram of an SDR (Software Defined Radio) transmitter stage incorporated in the test apparatus of FIG. 2.

In FIG. 3, the structure of the SDR unit 10 is shown in greater detail with reference to operation in uplink mode. For simplicity, FIG. 3 shows only the parts of the SDR unit 10 involved in the uplink operation. In one embodiment, the SDR uplink stages 14.1, ..., 14.N have identical structures. In what follows, only the SDR uplink stage 14.1 will thus be described in detail. It may, however, be understood that what has been set forth applies also to all the other SDR uplink stages 14.2, ..., 14.N present.

Associated to the SDR uplink stage 14.1 is a respective set of M simulated mobile terminals 11, each of which supplies a respective bit stream $BS_{11}, \ldots, BS_{1M}$.

The SDR uplink stage 14.1 comprises a plurality of parallel processing branches 17 and a mapping and transformation stage and is coupled to the respective transmitter/receiver module 13.1. Each parallel processing branch 17 is coupled to a respective simulated mobile terminal 11 for receiving the corresponding bit stream $BS_{11}, \ldots, BS_{1M}$.

In greater detail, each of the parallel processing branches 17 comprises a serial-to-parallel converter 20, a symbol-generator module 21, a DFT (Discrete Fourier Transform) module 22 and a channel-simulator module 23.

The serial-to-parallel converter 20 of each parallel processing branch 17 receives at input a respective bit stream $BS_{11}, \ldots, BS_{1M}$ and forms words of K bits each, according to the modulation scheme used (for example, BPSK, 16QAM, 64QAM). The words are supplied to the symbol-generator module 21, which, in a per se known manner, performs a mapping on a (PSK or QAM) constellation and in this way generates complex samples representing the modulated bit stream. In practice, a constellation of $2^K$ complex points (symbols), each having an amplitude and a phase (or, equivalently, a real part and an imaginary part), is used for representing K bits to be transmitted on one of the sub-carriers assigned to a given mobile terminal by the radio base station 3. Associated to each pair of values of amplitude and phase (or of real part and imaginary part) is a specific combination of the K bits. The bit stream is encoded by sequences of pairs of values of amplitude and phase (or of real part and imaginary part) corresponding to respective symbols of the constellation. Each sub-carrier assigned is modulated in amplitude and phase, for a time interval, according to the symbol associated to a sequence of K bits to be transmitted.

The outputs of the symbol-generator modules 16 thus define the spectral content, in baseband, associated to each simulated mobile terminal 11.

In what follows, the complex samples supplied by the symbol-generator modules 16 will be referred to as samples IQ. The symbol-generator modules 16 thus supply respective sequences of samples $IQ_{11}, \ldots, IQ_{1M}$, with which the bit streams $BS_{11}, \ldots, BS_{1M}$ supplied by the simulated mobile terminals 11 are encoded. In particular, the samples $IQ_{11}, \ldots, IQ_{1M}$, are a baseband representation of portions of respective bit streams $BS_{11}, \ldots, BS_{1M}$.

The DFT module 22 (which is required only in the case of SC-FDMA modulation) computes the discrete Fourier transform on sets of samples $IQ_{11}, \ldots, IQ_{1M}$. In practice, the output of the DFT module 22 supplies a respective baseband signal $SBB_{11}, \ldots, SBB_{1M}$ for a bandwidth assigned to the simulated mobile terminal 11 connected. The DFT modules 22 have the effect of reducing the PAPR (Peak-to-Average Power Ratio).

Each baseband signal $SBB_{11}, \ldots, SBB_{1M}$ represents the amplitude and phase associated to a sub-carrier assigned for a time interval.

In the case of OFDM modulation, the DFT module 22 is not present, and the baseband signals $SBB_{11}, \ldots, SBB_{1M}$ are directly represented by the samples $IQ_{11}, \ldots, IQ_{1M}$.

Consequently, in what follows, by "baseband signals $SBB_{11}, \ldots, SBB_{1M}$" are meant samples IQ modified by the DFT modules 22 in the case of SC-FDMA modulation and samples IQ in the case of OFDM modulation.

In practice, in each parallel processing branch 17, the serial-to-parallel converter 20, the symbol-generator module 21, and (in the case of SC-FDMA modulation) the DFT module 22 form a conversion stage, which converts the respective bit stream $BS_1, \ldots, BS_M$ into a corresponding baseband signal $SBB_1, \ldots, SBB_M$ in the frequency domain.

The channel-simulator module 23 is based upon a channel model in a respective condition. The channel-simulator modules 23 of the various parallel processing branches 17 implement respective distinct channel conditions, corresponding to as many situations envisaged by way of example (for instance, corresponding to use of a mobile terminal in stationary conditions in a closed environment, when moving on foot in a closed environment or out of doors, on a means of transport with slow and irregular motion, on a means of transport with fast and substantially constant motion, and so on). As explained in detail hereinafter, the channel-simulator module operates on the respective baseband signal $SBB_{1T}$ for simulating the effect of the communication channel between the eNodeB and a mobile terminal connected thereto in given conditions.

The channel-simulator modules 23 supply respective modified baseband signals $SBB_{11}', \ldots, SBB_{1M}'$.

The mapping and transformation stage 18 comprises a mapping module 25, an inter-cell interference module 27, an IFFT (Inverse Fast Fourier Transform) module 28, an encoding module 29, and a parallel-to-serial converter 30.

The mapping module 25 receives the outputs of the channel-simulator modules 23 of the parallel processing branches 17 and carries out a mapping of the modified baseband signals $SBB_{11}', \ldots, SBB_{1M}'$ at input, assigning to each a sub-carrier for modulation. The law of correspondence between input and output of the mapping module 25 is established by the radio-resource manager in the eNodeB 3, which chooses and communicates to each mobile terminal for each time interval which band and which sub-carriers will be used. In practice, the mapping module 25 operates as a multiplexer controlled by the settings supplied by the eNodeB 3. A translation on the outputs of the mapping module 25 (and thus on the inputs of the IFFT module 28) is equivalent to a translation in frequency by the bandwidth assigned to a mobile terminal (here a simulated mobile terminal 11).

Figure 4:
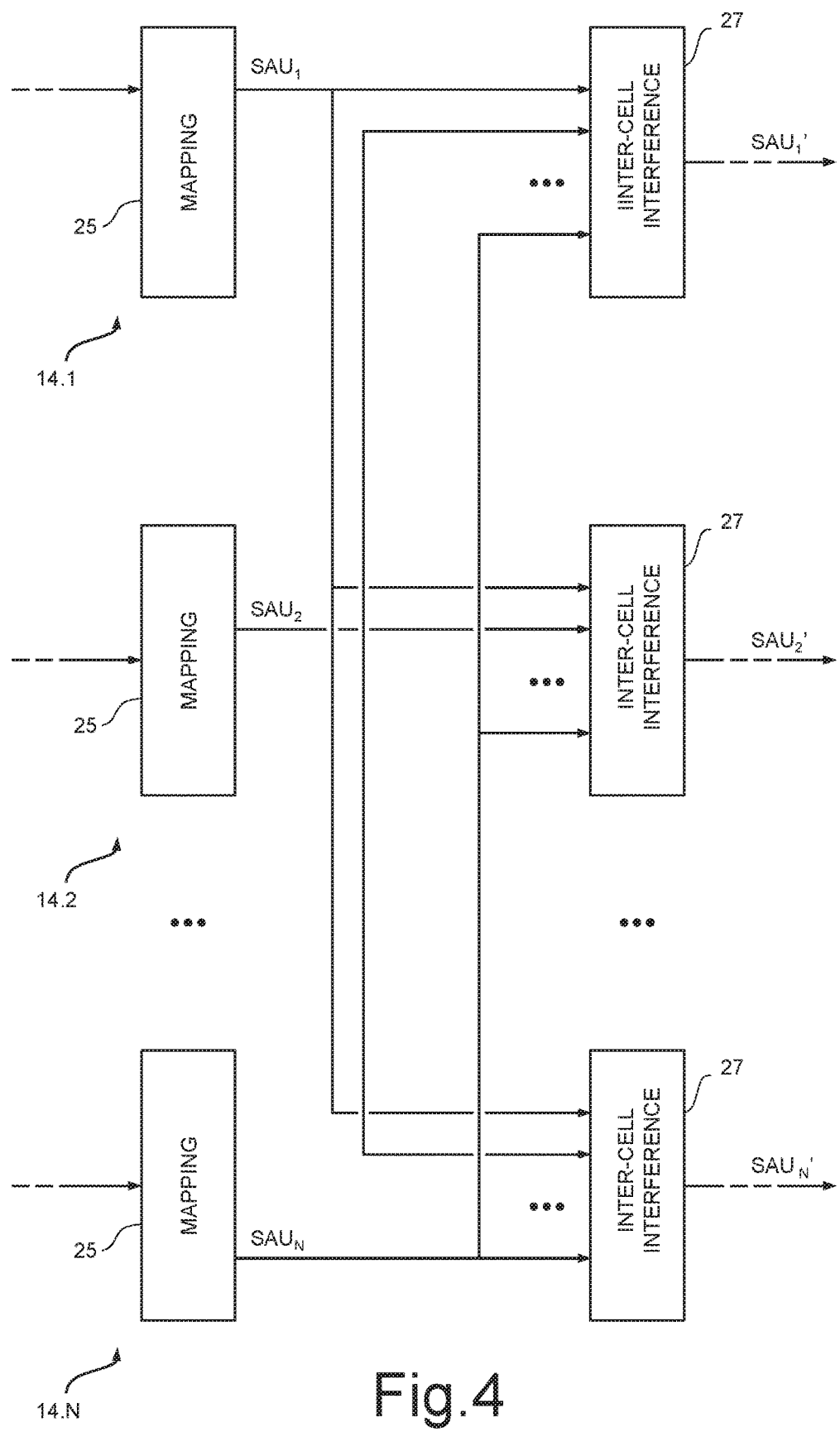
FIG. 4 is a more detailed block diagram of a portion of the SDR uplink stage of FIG. 3.

The result of the processing performed by the mapping module 25 is an uplink sub-carrier vector $SAU_1$, which is supplied to the inter-cell interference module 27 of the SDR uplink stage 14.1. As shown more clearly in FIG. 4, the uplink sub-carrier vector $SAU_1$ of the SDR uplink stage 14.1 is also supplied to the inter-cell interference modules 27 of the other SDR uplink stages 14.2, . . . , 14.N. Further, the inter-cell interference module 27 receives the uplink sub-carrier vectors $SAU_2, \ldots, SAU_N$ of the other SDR uplink stages 14.2, . . . , 14.N. In one embodiment, the uplink sub-carrier vector $SAU_1$ of the SDR uplink stage 14.1 may be supplied to the inter-cell interference modules 27 of just some of the other SDR uplink stages 14.2, . . . , 14.N. Instead, the inter-cell interference module 27 of the SDR uplink stage 14.1 may receive the uplink sub-carrier vectors $SAU_2, \ldots, SAU_N$ of just some (at least one) of the other SDR uplink stages 14.2, . . . , 14.N.

The inter-cell interference module 27 is configured to combine the uplink sub-carrier vector $SAU_1$ of the respective SDR uplink stage 14.1 with the uplink sub-carrier vectors $SAU_2, \ldots, SAU_N$ of the other SDR uplink stages 14.2, . . . , 14.N, for simulating phenomena of inter-cell interference due to mobile terminals served by adjacent eNodeBs 3 that communicate over respective communication channels. The interfering mobile terminals are defined by simulated mobile terminals 11, which communicate with respective eNodeBs 3 through the SDR uplink stages 14.2, . . . , 14.N. The interference is caused by the superposition of the signals coming from the adjacent cells, represented by the uplink sub-carrier vectors $SAU_2, \ldots, SAU_N$ of the SDR uplink stages 14.2, . . . , 14.N weighted with respect to the uplink sub-carrier vector $SAU_1$.

With reference once again to FIG. 3, the inter-cell interference module 27 supplies a modified uplink sub-carrier vector $SAU_1'$ to the IFFT module 28.

The IFFT module 28 computes an inverse Fourier transform and transfers processing from the frequency domain to the time domain.

The encoding module 29 introduces into the signal a cyclic prefix in order to minimize the intersymbol interference.

The serial-to-parallel converter 23 converts the signals received by the encoding module 29 into an uplink stream of samples BST, which is supplied to the transmitter/receiver module 13.1, . . . , 13.N.

The transmitter/receiver module 13.1, . . . , 13.N, which is coupled in communication to the eNodeB 3, performs a digital-to-analog conversion, filtering operations, and a conversion of the signals supplied by the serial-to-parallel converter 23 into the frequency bandwidth used by the eNodeB 3.

The connection of the transmitter/receiver module 13.1, . . . , 13.N to the respective eNodeB 3 is performed by a communication port (not shown), which may comprise a connector that may be connected in wired mode or else via an antenna for radio communication. The connection with the eNodeB 3 may be performed also directly in baseband, without any need for frequency conversion.

Figure 5:
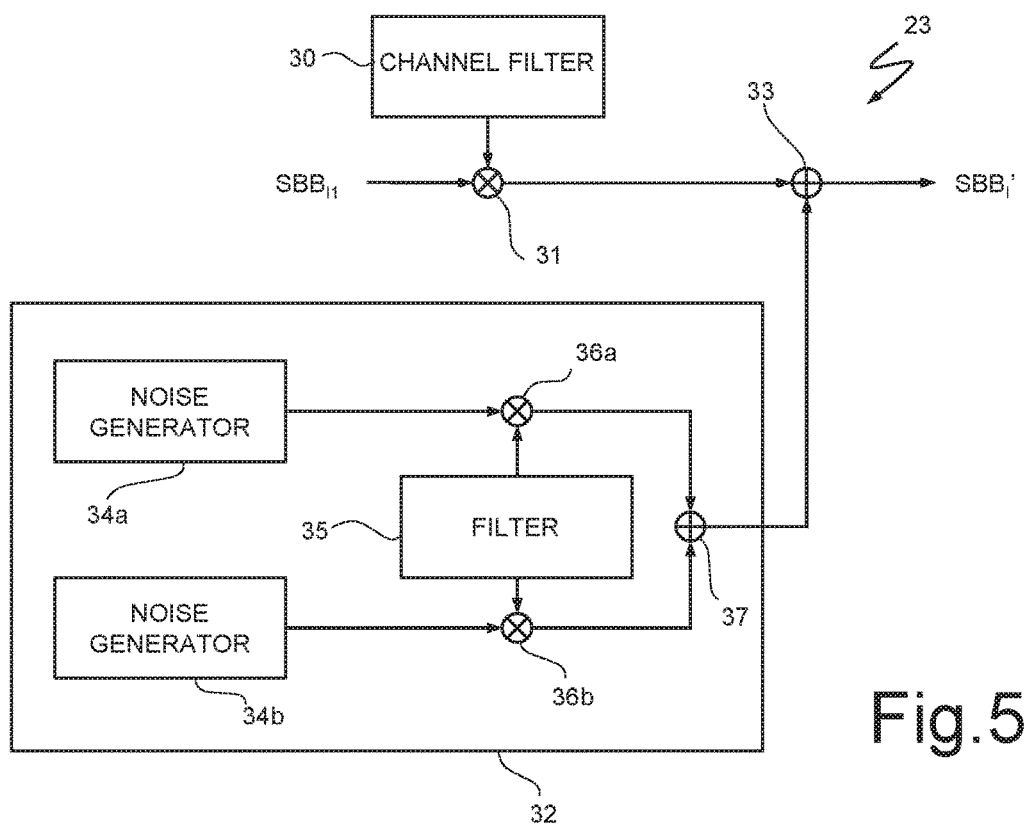
FIG. 5 is a more detailed block diagram of a first component of the SDR uplink stage of FIG. 3.

FIG. 5 illustrates the structure of the channel-simulator module 23 of one of the parallel processing branches 17 of the SDR uplink stage 14.1. It is understood that the channel-simulator modules 23 of the other parallel processing branches 17 of all the other SDR uplink stages 14.2, . . . , 14.N have an identical structure and may differ as regards the model of communication channel implemented.

The channel-simulator module 23 comprises a channel filter 30, a multiplier node 31, a complex-noise generator 32, and an adder node 33.

The channel filter 30 implements a model of a type of communication channel, by a time-variant transfer function identified by a set of time-variable coefficients (for example, gain, poles, and zeroes). For instance, the transfer functions are characterized for simulating use of a mobile terminal in stationary conditions in a closed environment, when moving on foot in a closed environment or out of doors, on a means of transport with slow and irregular motion, on a means of transport with fast and substantially constant motion, and so on. In one embodiment, the channel filter 30 is programmable for implementing different transfer functions, each corresponding to a respective type of communication channel. In this case, the channel filter 30 is provided with a memory element, stored in which are different sets of coefficients that identify corresponding transfer functions and are each time selected according to the test to be conducted.

The multiplier node 31 receives from the processing modules upstream of the channel-simulator module 23 the respective baseband signal $SBB_{11}$, . . . , $SBB_{1M}$ for the sub-carrier assigned and further receives the set of the coefficients that define the transfer function of the channel filter 30. The baseband signal $SBB_{11}$, . . . , $SBB_{1M}$ for the assigned sub-carrier and the transfer function are multiplied together, which is equivalent to computing the convolution thereof in the time domain.

The complex-noise generator 32 comprises a first random-number generator 34a and a second random-number generator 34b and a filter 35. The first and second random-number generators 34a, 34b independently supply random numbers, respectively for the real part and the imaginary part of the noise. The filter 35 is applied to the outputs of both of the random-number generators 34a, 34b via convolution in the frequency domain (first and second multiplier nodes 36a, 36b) and takes into account the fact that the noise spectral density may not be considered perfectly uniform over the entire domain. The real part and imaginary part of the noise are then added together by an adder node 35.

The adder node 35 combines in an additive way the baseband signal and the noise supplied by the complex-noise generator 33. The output of the adder node thus supplies a baseband signal in the frequency domain that takes into account the effect of the communication channel on the signals coming from the mobile terminals (in this case, from the mobile-terminal simulators 6).

Figure 6:
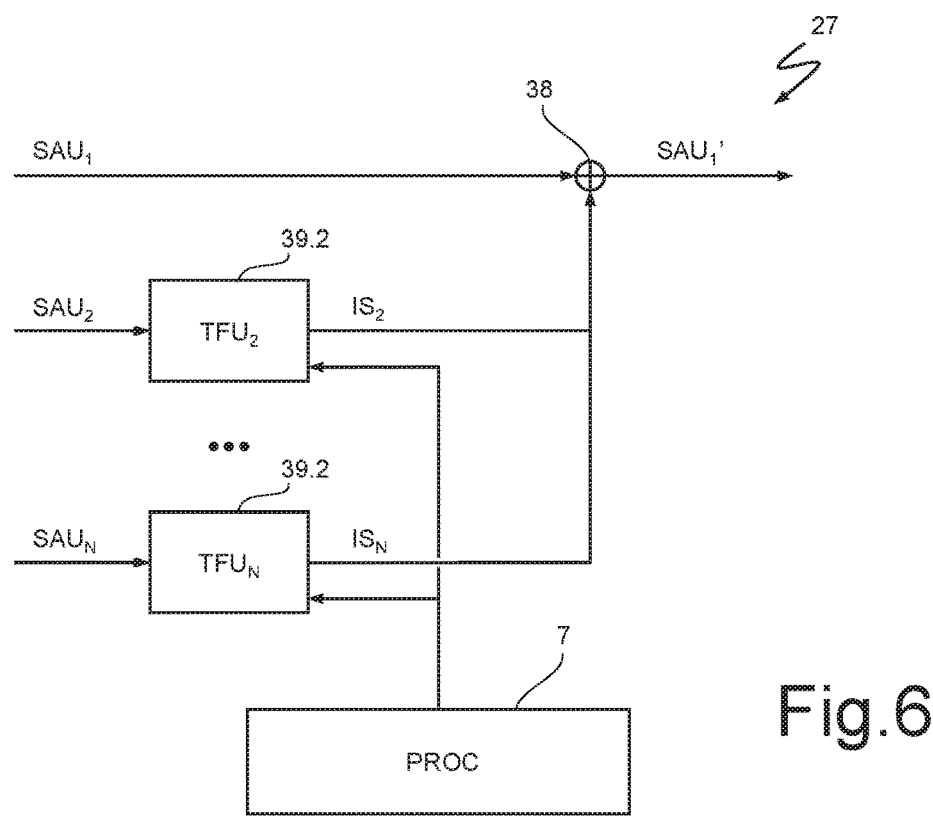
FIG. 6 is a more detailed block diagram of a second component of the SDR uplink stage of FIG. 3.

The inter-cell interference module 27 is illustrated in detail in FIG. 6, where also the control unit 7 is represented.

In one embodiment, the inter-cell interference module 27 comprises an adder node 38 and a plurality of processing modules 39.2, . . . , 39.N.

An input of the adder node 38 receives a main signal, i.e., the uplink sub-carrier vector $SAU_1$ of the SDR uplink stage 14.1 to which the adder node 38 belongs (and is thus indicative of the communications of the mobile terminals coupled to the serving cell of the SDR uplink stage 14.1).

Further inputs of the adder node 38 receive respective interference signals $IS_2$, . . . , $IS_N$. The interference signals $IS_2$, . . . , $IS_N$ are obtained from respective uplink sub-carrier vectors $SAU_2$, . . . , $SAU_N$ by the processing modules 39.2, . . . , 39.N, which apply respective uplink transfer functions $TFU_2$, . . . , $TFU_N$ representing the attenuation between an interfering mobile terminal and the simulated mobile terminals 11 connected to the eNodeB 3 of the SDR uplink stage 14.1.

The adder node 38 adds the interference signals $IS_2$, . . . , $IS_N$ received at input to the uplink sub-carrier vector $SAU_1$ of the SDR uplink stage 14.1 to which the adder node 38 belongs, in order to determine the modified uplink sub-carrier vector $SAU_1'$.

The uplink transfer functions $TFU_2$, . . . , $TFU_N$ depend upon the specific sub-carrier used and may vary in time. In one embodiment, the uplink transfer functions $TFU_2$, . . . , $TFU_N$ are linear and are defined by gain parameters and by time constants of poles and zeroes. The parameters of the uplink transfer functions $TFU_2$, . . . , $TFU_N$ are selected and set by the control unit 7, for example in a random way within admissible intervals, which may in turn be determined in an empirical way. Some of the uplink transfer functions $TFU_2$, . . . , $TFU_N$ may be zero (for example, a gain parameter may be zero). In this case, the corresponding simulated mobile terminals 11 do not produce any interference. The selection may be performed by an operator on the basis of a test scenario (for example, simulated mobile terminal located at the cell boundary, simulated mobile terminal connected to pico-cells or femto-cells set within macro-cells, etc.). The possibility of setting the parameters via the control unit 7 enables selection of which cells and which interfering simulated mobile terminals to include in the simulation for each of the serving cells.

Positioning of the mapping module 25 downstream, and of the IFFT module 28 upstream advantageously allow to introduce the simulation of the inter-cell interference with a negligible increase in the computational load.

Figure 7:
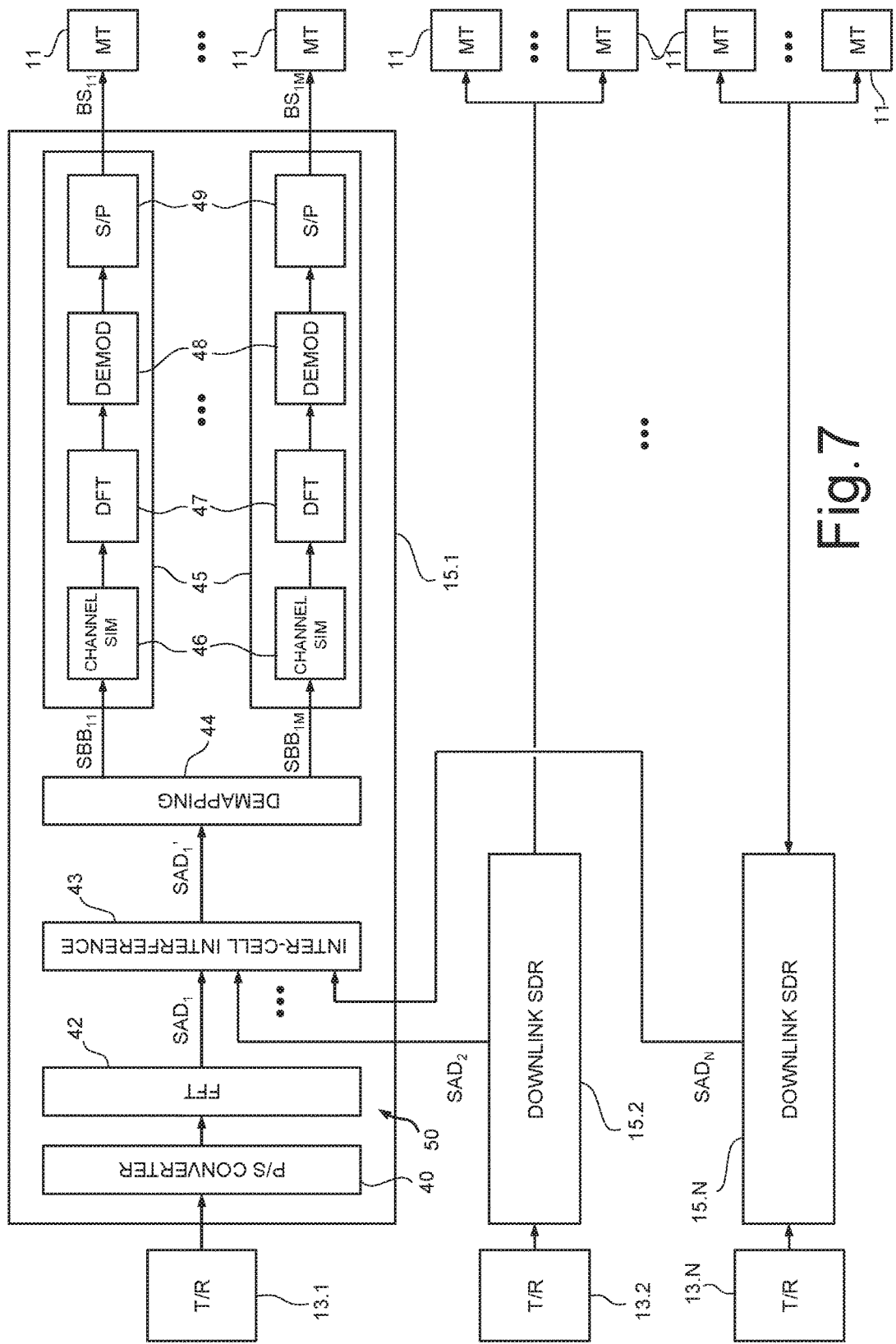
FIG. 7 is a more detailed block diagram of a SDR downlink stage incorporated in the test apparatus of FIG. 2.

In FIG. 7, the structure of the SDR unit 10 is shown with reference to the downlink operating mode. For simplicity, FIG. 7 shows only the parts of the SDR unit 10 involved in downlink operation. The SDR downlink stages 15.1, . . . , 15.N, one of which (15.1) is illustrated in FIG. 7, are substantially specular to the SDR uplink stages 14.1, . . . , 14N. Hereinafter, only the SDR downlink stage 15.1 is illustrated in detail, it being in any case understood that the other SDR downlink stages 15.2, . . . , 15.N have the same structure, and the following description equally applies also to them.

In the embodiment described, the SDR downlink stage 15.1 is coupled to the respective receiver module 13.1, which receives the signals coming from the eNodeB 3 and forms a sequence of samples in the time domain, and comprises a serial-to-parallel converter 40, an FFT module 42, an inter-cell interference module 43, a demapping module 44, and a plurality of parallel processing branches 45, each coupled to a respective simulated mobile terminal 11. The serial-to-parallel converter 40, the FFT module 42, the inter-cell interference module 43, and the demapping module 44 form a conversion and demapping stage 50.

The receiver module 40 performs the radiofrequency-to-baseband conversion and the analog-to-digital conversion of the signals received.

The stream of samples processed by the receiver module 40 is supplied to the serial-to-parallel converter 40, which removes the cyclic prefixes and supplies the FFT module 42.

In turn, the FFT module 42 supplies downlink sub-carrier vectors $SAD_1, \ldots, SAD_N$ to the inter-cell interference module 43.

Figure 8:
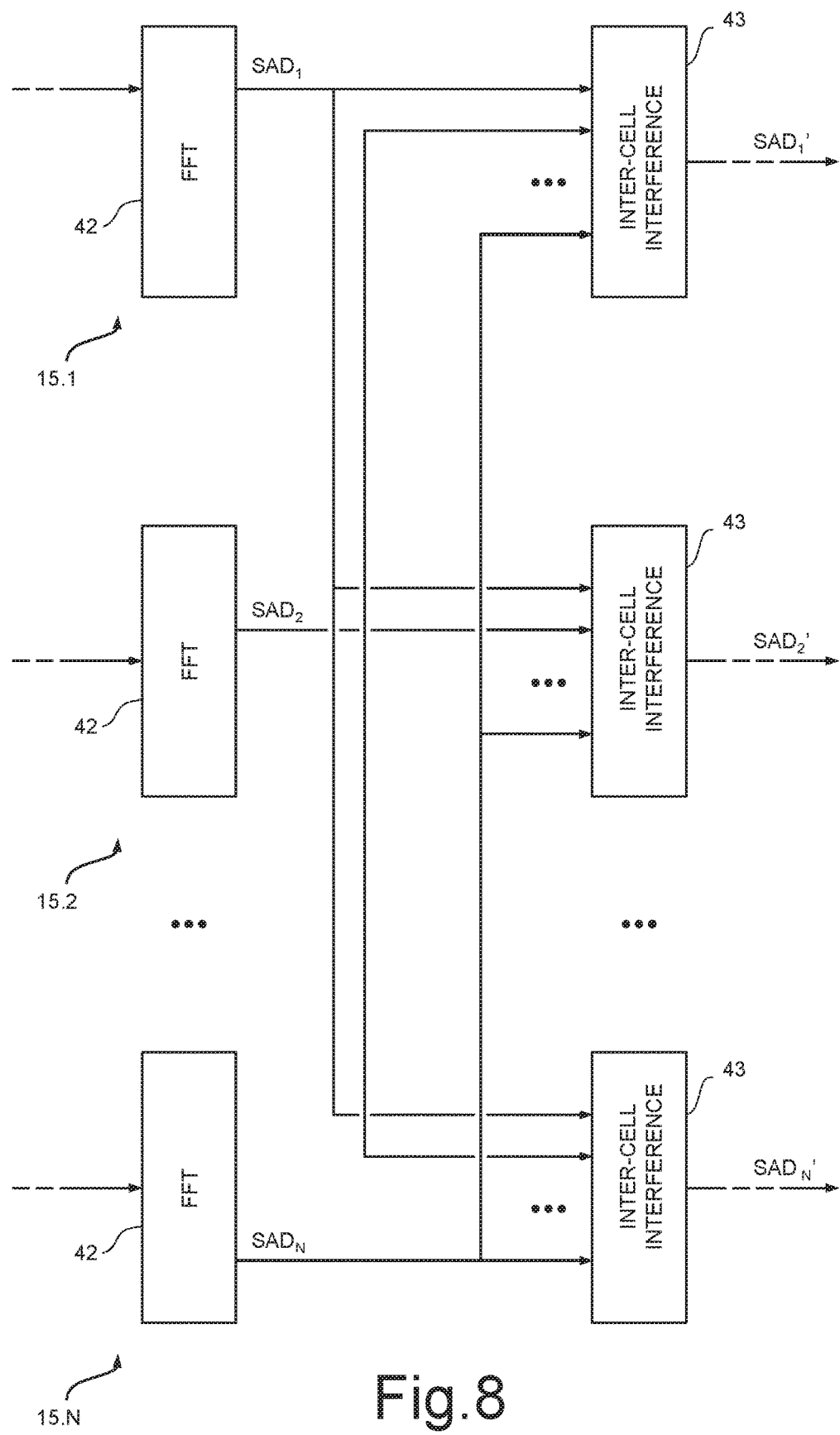
FIG. 8 is a more detailed block diagram of a portion of the SDR downlink stage of FIG. 7.

As shown more clearly in FIG. 8, the downlink sub-carrier vector $SAD_1$ of the SDR downlink stage 15.1 is also supplied to the inter-cell interference modules 43 of the other SDR downlink stages 15.2, 15.N. Further, the inter-cell interference module 43 receives the downlink sub-carrier vectors $SAD_2, \ldots, SAD_N$ of the other SDR downlink stages 15.2, ..., 15.N. In one embodiment, the downlink sub-carrier vector SAD' of the SDR downlink stage 15.1 may be supplied to the inter-cell interference modules 43 of only some of the other SDR downlink stages 15.2, 15.N. Instead, the inter-cell interference module 27 of the SDR downlink stage 15.1 may receive the downlink sub-carrier vectors $SAD_2, \ldots, SAD_N$ of only some (at least one) of the other SDR downlink stages 15.2, ..., 15.N.

The inter-cell interference module 27 is configured to combine the downlink sub-carrier vector SAD' of the respective SDR downlink stage 15.1 with the downlink sub-carrier vectors $SAD_2, \ldots, SAD_N$ of the other SDR downlink stages 15.2, ..., 15.N for simulating phenomena of inter-cell interference due to neighbouring eNodeBs 3 that communicate through respective communication channels with mobile terminals connected thereto. The interference is given by the superposition of the signals coming from the adjacent cells, represented by the downlink sub-carrier vectors $SAD_2, \ldots, SAD_N$ of the SDR downlink stages 15.2, ..., 15.N weighted with respect to the downlink sub-carrier vector SAD'.

Figure 9:
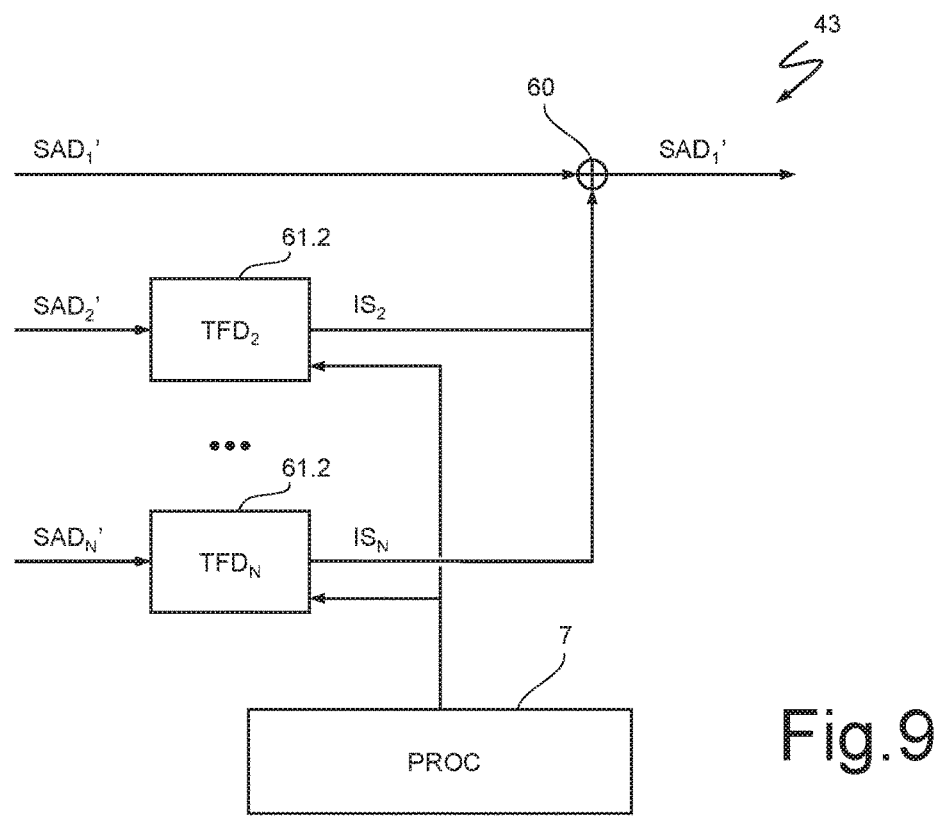
FIG. 9 is a more detailed block diagram of a first component of the SDR downlink stage of FIG. 7.

The structure of the inter-cell interference module 43 is substantially the same as that of the inter-cell interference module 27 with an adder node 60 (FIG. 9) that combines the downlink sub-carrier vector SAD' of the serving eNodeB 3 and the downlink sub-carrier vectors $SAD_2, \ldots, SAD_N$ of the other SDR downlink stages 15.2, ..., 15.N, weighted by processing modules 61.2, ..., 62.N with respective downlink transfer functions $TFD_1, \ldots, TFD_N$, which depend upon the frequency of the specific sub-carrier and are variable in time, and which represent the attenuation between an adjacent eNodeB 3 and the simulated mobile terminals 11 connected to the eNodeB 3 of the SDR downlink stage 15.1.

The inter-cell interference module 43 supplies a modified downlink sub-carrier vector $SAD_1'$ to the demapping module 44.

The demapping module 44 receives the modified downlink sub-carrier vector $SAD_1'$ and supplies baseband signals $SBB_{11}, \ldots, SBB_{1M}$ to the parallel processing branches 45, according to the assignments established by the eNodeB 3.

The parallel processing branches 45 are coupled to respective simulated mobile terminals 11, and each of them comprises a channel-simulator module 46, which receives a respective sequence of symbols from the demapping module 44, a DFT module 47, a demodulator 48, and a parallel-to-serial converter 49.

In each parallel processing branch 45, the channel-simulator module 46 has substantially the same structure and operates in the same way as the channel-simulator modules 23 of the parallel processing branches 17 of the SDR uplink stage 14.1.

The parallel-to-serial converter 49 converts demodulated samples into sequences of bits, which are supplied to the respective simulated mobile terminals 11.

Figure 10:
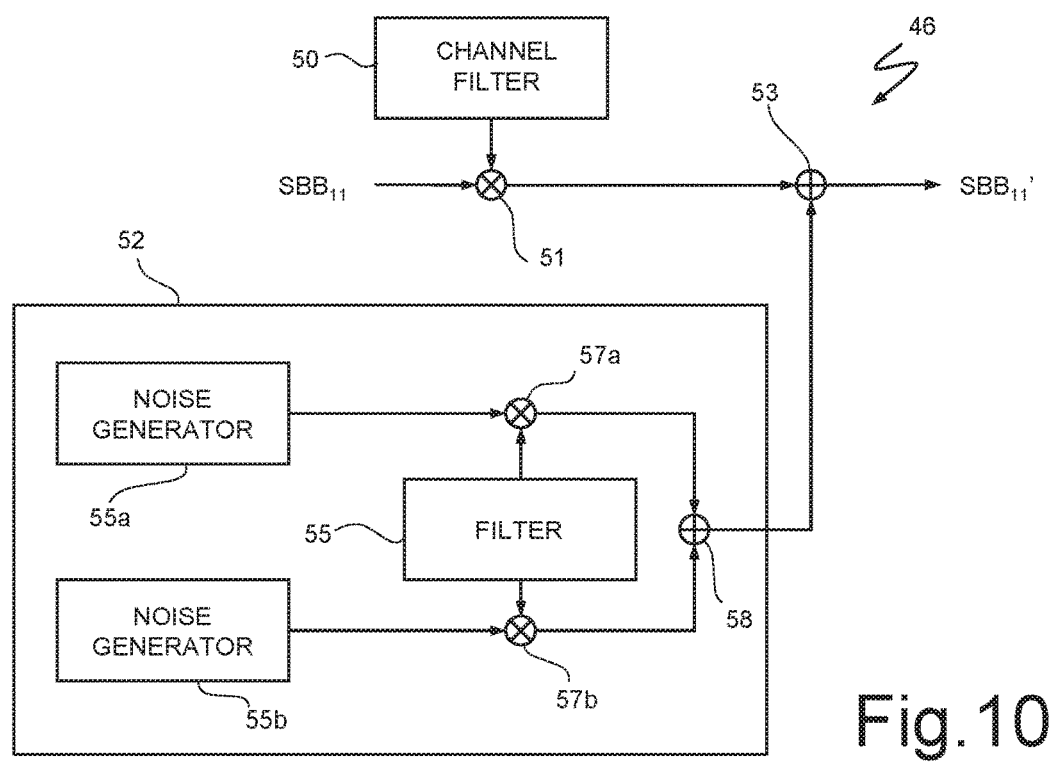
FIG. 10 is a more detailed block diagram of a second component of the SDR downlink stage of FIG. 7.

In particular (FIG. 10), each channel-simulator module 46 comprises a channel filter 50, a multiplier node 51, a complex-noise generator 52, and an adder node 53.

The channel filter 50 implements a model of a type of communication channel by a time-variant transfer function identified by a set of time-variable coefficients (for example, gain, poles, and zeroes).

The multiplier node 51 receives from the demapping module 44 a respective baseband signal $SBB_{11}, \ldots, SBB_{1M}$ for the assigned sub-carrier and further receives the set of the coefficients that define the transfer function of the channel filter 50. The baseband signal for the assigned sub-carrier and the transfer function are multiplied together, which is equivalent to computing convolution thereof in the time domain.

The complex-noise generator 52 comprises a first random-number generator 55a and a second random-number generator 55b, and a filter 56. The first and second random-number generators 55a, 55b independently supply random numbers, respectively for the real component and the imaginary component of the noise. The filter 56 is applied to the outputs of both of the random-number generators 55a, 55b by convolution in the frequency domain (first and second multiplier nodes 57a, 57b) and takes into account the fact that the noise spectral density may not be considered perfectly uniform over the entire domain. The real part and the imaginary part of the noise are then added together by an adder node 58.

The adder node 53 combines in an additive way the baseband signal $SBB_{11}, \ldots, SBB_{1M}$ and the noise supplied by the complex-noise generator 33. The output of the adder node 53 thus supplies a modified baseband signal $SBB_{11}', \ldots, SBB_{1M}'$ in the frequency domain that takes into account the effect of the communication channel on the signals coming from the eNodeB 3.

As already noted, the inter-cell interference modules enable simulation of the interference of adjacent cells on the bidirectional communication between a mobile terminal and the respective serving cell, adding a negligible computational load. Thanks to the structure and location of the inter-cell interference modules the processing is performed substantially in baseband. It is thus possible to perform realistic simulations that involve numerous populations of mobile terminals and different eNodeBs of a wireless telecommunication network.

Finally, it is evident that modifications and variations may be made to the test apparatus and to the testing method described, without thereby departing from the scope of the present invention, as defined in the annexed claims.

What is claimed is:

1. A test apparatus for a telecommunication network based upon OFDM or SC-FDMA technology, the test apparatus comprising: a plurality of simulated mobile terminals, configured to supply respective bit streams, in accordance with a communication standard; a plurality of SDR stages configured to receive the bit streams of respective simulated mobile terminals and to communicably couple with respective base stations of a telecommunication network, the SDR stages comprising respective SDR uplink stages and respective SDR downlink stages; wherein at least one SDR uplink stage comprises: at least one parallel processing branch, which is coupled to a respective one of the simulated mobile terminals for receiving the corresponding bit stream and comprises at least one processor configured to: convert the respective bit stream into a respective baseband signal in the frequency domain, which represents the amplitude and phase associated with a respective sub-carrier assigned for a time interval, generate a respective uplink sub-carrier vector via a mapping of the baseband signals in which each baseband signal is assigned a sub-carrier for modulation, combine the uplink sub-carrier vector of the respective SDR stage with the uplink sub-carrier vectors of at least one of the other SDR stages, and perform an inverse transform of the baseband signals.

2. The apparatus according to claim 1, wherein the at least one processor configured to combine the uplink sub-carrier vector of the respective SDR stage with the uplink sub-carrier vectors of at least one of the other SDR stages further comprises the at least one processor configured to apply respective uplink transfer functions to the uplink sub-carrier vectors of the SDR stages other than the respective SDR stage.

3. The apparatus according to claim 2, wherein the uplink transfer functions are dependent upon respective sub-carriers.

4. The apparatus according to claim 2, wherein the uplink transfer functions are variable in time.

5. The apparatus according to claim 2, wherein the uplink transfer functions are defined by respective parameters, the apparatus comprising a control unit configured to determine the parameters of the uplink transfer functions.

6. The apparatus according to claim 2, wherein the at least one processor configured to combine the uplink sub-carrier vector of the respective SDR stage with the uplink sub-carrier vectors of at least one of the other SDR stages further comprises the at least one processor configured to: determine interference signals from respective uplink sub-carrier vectors by respective uplink transfer functions; and an adder node configured to add the uplink sub-carrier vector of the respective SDR stage to the interference signals.

7. The apparatus according to claim 1, wherein each SDR uplink stage comprises: a plurality of respective parallel processing branches, which are coupled to respective simulated mobile terminals for receiving the corresponding bit streams and comprises the at least one processor configured to: convert the respective bit streams into respective baseband signals in the frequency domain, generate a respective uplink sub-carrier vector via a mapping of the respective baseband signals in which each baseband signal is assigned a sub-carrier for modulation, combine the uplink sub-carrier vector of the respective SDR stage with the uplink sub-carrier vectors of the other SDR stages, and perform an inverse transform of the respective baseband signals.

8. The apparatus according to claim 1, wherein at least one SDR downlink stage comprises: a plurality of downlink parallel processing branches, coupled to respective simulated mobile terminals; a receiver stage, configured to receive signals coming from a base station of the telecommunication network and at least one processor configured to: perform a radiofrequency-to-baseband conversion, an analog-to-digital conversion, and a serial-to-parallel conversion of the signals received, supply a respective downlink sub-carrier vector using signals supplied by the receiver stage, generate a respective modified downlink sub-carrier vector from a combination of the downlink sub-carrier vector of the respective SDR stage and the downlink sub-carrier vectors of at least one of the other SDR stages, and determine baseband signals from the modified downlink sub-carrier vector and to supply a respective baseband signal to each respective simulated mobile terminal.

9. The apparatus according to claim 8, wherein the at least one processor configured to generate a respective modified downlink sub-carrier vector from a combination of the downlink sub-carrier vector of the respective SDR stage and the downlink sub-carrier vectors of at least one of the other SDR stages further comprises the at least one processor configured to apply respective downlink transfer functions to the downlink sub-carrier vectors of the SDR stages other than the respective SDR stage.

10. The apparatus according to claim 8, wherein each SDR downlink stage comprises: a plurality of respective downlink parallel processing branches, coupled to respective simulated mobile terminals; a respective receiver stage, configured to receive signals coming from a respective base station of the telecommunication network and at least one processor configured to: perform a radiofrequency-to-baseband conversion, an analog-digital conversion, and a serial-to-parallel conversion of the signals received, supply a respective downlink sub-carrier vector using signals supplied by the respective receiver stage, generate a respective modified downlink sub-carrier vector from a combination of the downlink sub-carrier vector of the respective SDR stage and of the downlink sub-carrier vectors of at least one of the other SDR stages, and determine baseband signals from the respective modified downlink sub-carrier vector and to supply a respective baseband signal to each respective simulated mobile terminal.

11. A method for testing a telecommunication network based upon OFDM or SC-FDMA technology, the method comprising: supplying a plurality of bit streams, in accordance with a communication standard, the bit streams being representative of respective simulated mobile terminals; processing the bit streams; and transmitting to a plurality of base stations signals derived from respective sets of processed bit streams; wherein processing comprises: converting the bit streams into respective baseband signals in the frequency domain, which represent the amplitude and phase associated with respective sub-carriers assigned for a time interval; generating a respective uplink sub-carrier vector for each base station via a mapping of the respective baseband signals in which each baseband signal is assigned a sub-carrier for modulation; combining the uplink sub-carrier vector associated with a base station with the uplink sub-carrier vectors of at least one of the other base stations; and performing an inverse transform of the baseband signals.

12. The method according to claim 11, comprising: receiving sets of signals coming from the base stations of the telecommunication network and directed to respective simulated mobile terminals; performing a radiofrequency-to-baseband conversion, an analog-to-digital conversion, and a serial-to-parallel conversion of the sets of signals received; generating a respective downlink sub-carrier vector from each set of signals; generating a respective modified downlink sub-carrier vector from a combination of the downlink sub-carrier vector of one of the sets of signals and of the downlink sub-carrier vectors of at least one of the other sets of signals; determining baseband signals from the modified downlink sub-carrier vector; and supplying a respective baseband signal to each simulated mobile terminal.

* * * * *